Figure 1:
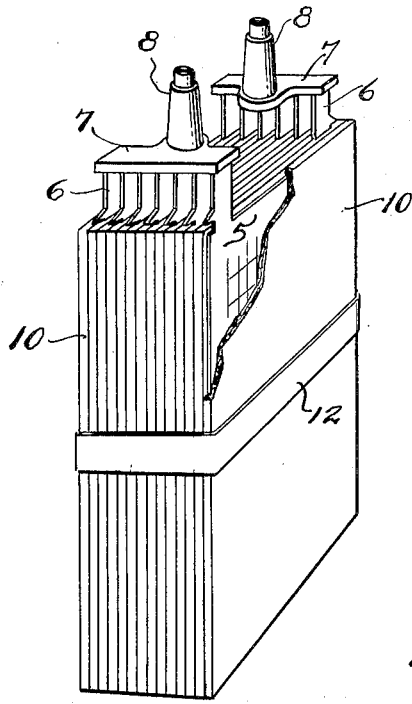

Dec. 28, 1926.  1,611,910
C. W. HAZELETT
METHOD OF MAKING AND SHIPPING STORAGE BATTERY ELEMENTS
Filed Jan. 23, 1922   2 Sheets-Sheet 1

INVENTOR
Clarence W. Hazelett,

Dec. 28, 1926.
C. W. HAZELETT
1,611,910
METHOD OF MAKING AND SHIPPING STORAGE BATTERY ELEMENTS
Filed Jan. 23, 1922   2 Sheets-Sheet 2
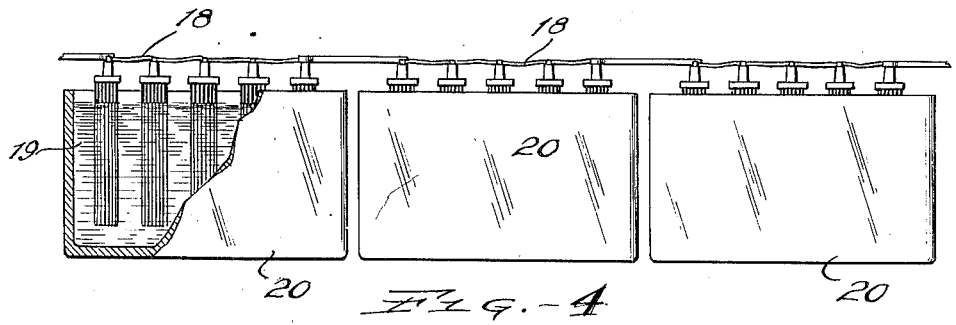
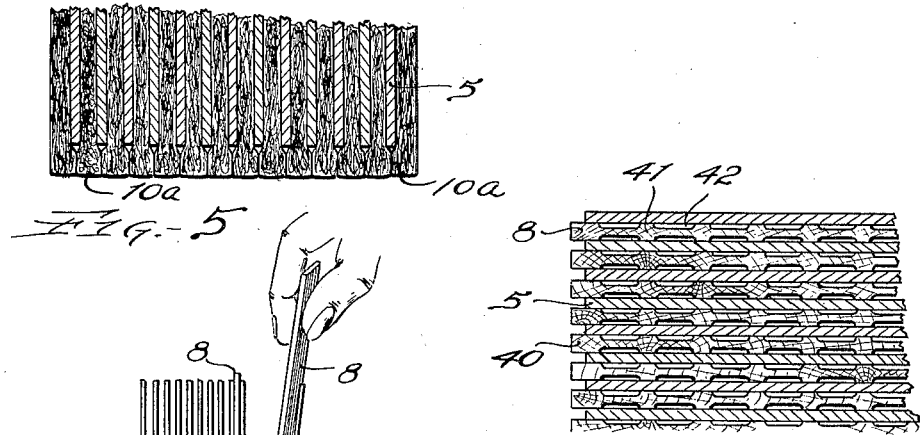
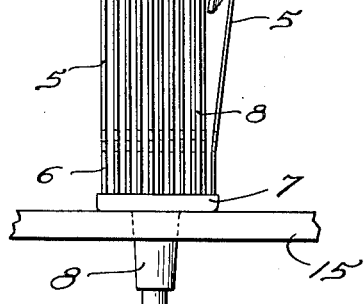
INVENTOR
Clarence W. Hazelett,
BY Bates, Macklin,
ATT'YS Patented Dec. 28, 1926.

1,611,910

UNITED STATES PATENT OFFICE.

CLARENCE W. HAZELETT, OF CLEVELAND, OHIO, ASSIGNOR, BY MESNE ASSIGNMENTS, TO THE CLEVELAND TRUST COMPANY, TRUSTEE, OF CLEVELAND, OHIO.

METHOD OF MAKING AND SHIPPING STORAGE-BATTERY ELEMENTS.

Application filed January 23, 1922. Serial No. 531,116.

This invention is concerned with the manufacture and shipping of storage battery elements. The essential object of the invention is the accomplishment of great simplicity in the manufacture of a storage battery element, and the completion of this element into a novel package unit, which may greatly facilitate shipping. Further objects include the process of economical and practical method of shipping storage battery elements in a charged condition, so that they may be assembled into a battery after shipment with the greatest ease and economy both as to time and the character of labor involved.

A present method of constructing and shipping storage battery elements which has gone into wide use is the shipping of the complete batteries in specially constructed crates, requiring them to be always right side up to retain the liquid, and resulting in a comparatively heavy and cumbersome package. Such manner of shipment requires that the batteries should be put into use before any great lapse of time, and involves bulk and excessive weight of the package, which must be handled with great care.

A more widely accepted method is the shipping of the plates and connecting straps independently, the plates being dried subsequent to the factory formation process. In this case, the service stations are required to be well equipped to weld the plates and connecting straps, and otherwise complete the assembling of the elements, which requires not only special equipment but a high degree of skill. The element thus assembled must then be given what is known as a reforming charge and developing cycle in order to put it into operating condition. This later operation required operators skilled in the electrical development of the battery and several days of continuous attention are necessary to accomplish such reforming satisfactorily.

When the batteries are shipped complete, charged and with the electrolyte in them, the elements are assembled and the plates and connecting straps of course welded at the factory.

Another method is the welding of the connecting strips to the completed plates, which have been dried, and the temporary assembling of the elements, with the use of straw board pieces inserted between the plates in place of separators to prevent breakage which would ordinarily result from the weight and fragility of the materials. The service stations remove these straw board spacers, insert standard separators which must be shipped separately and then carry out the above mentioned reforming charge and developing cycle. Under none of the present methods is it practical to paste the plates or grids at the service stations, or distant points, because this operation necessitates highly skilled labor, special equipment, careful and close attention and continuous methods of treatment. There are but very few individuals connected with the battery industry who have the necessary training and skill to economically and properly treat battery plates in what is known as the forming process. The pasting of the plates and the welding of them to the connecting strips not only requires skill but the equipment must include burning combs, various jigs and fixtures.

The shipping of individual elements of standard construction in a charged condition is highly impractical. This requires the use of standard separators and the exposed plate particularly the negative, heats, oxidizes, dries out and hardens, as a result of contact with the air. This is likely to permanently damage the battery and in any instance requires the above mentioned reforming cycle.

My method of constructing storage battery elements completing the assembling and charging at the factory and shipping in this charged condition without damage thereto and with the greatest economy in handling and assembling into the complete battery has proven successful. I have chosen to use it in connection with storage battery elements of the character shown and described in my application on a storage battery, filed February 21, 1921, Serial No. 446,767.

The present invention greatly reduces the cost of shipment and assembling of elements in completed batteries. It avoids the high freight rates incident to the shipping of batteries filled with electrolyte, and eliminates the difficulties of packing and attains other objects above outlined. Further advantages gained by my method are the great utility in connection with the rebuilding of old batteries, as well as the shipment of completely charged elements for the construction of new batteries at any service station, without regard to equipment or character of labor at such stations.

My system of shipment of storage batteries may be adapted to batteries of various kinds of plates and separators. I have shown in the accompanying drawings, illustrating my process of assembling and package shipment of the elements, battery element construction similar to that forming the subject matter of my prior application above designated.

My method of accomplishing the above objects is more fully hereinafter described in connection with the accompanying drawings; other advantages and novel characteristics will become apparent in the following description, and the essential characteristics are summarized in the claims.

Figure 2:
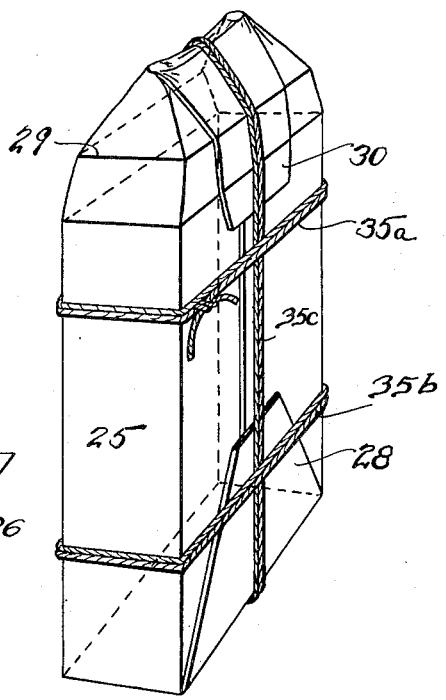
Figure 3:
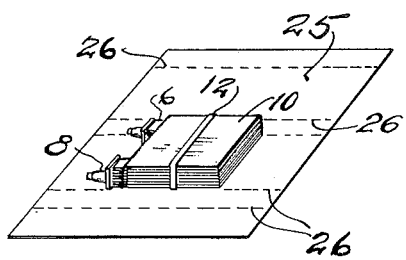

In the drawings, Fig. 1 is a perspective view of the completed storage battery element ready for wrapping; Fig. 2 shows the element wrapped ready for shipment; Fig. 3 illustrates the element placed upon the wrapper ready to be enclosed therein; Fig. 4 illustrates a method of charging the assembled elements in groups prior to the wrapping; Fig. 5 is a vertical section taken substantially transversely of the plates, on a somewhat enlarged scale, illustrating the manner in which the separators protect the outside edges of the plates; Fig. 6 illustrates the placing of the separators in position or replacing the temporary separators with the separators to become a permanent part of the battery, showing the plates in edge view supported in a position to most conveniently receive such separators; Fig. 7 is a horizontal section of a portion of a group of plates and separators showing one form of standard separator in position after the removal of temporary separators.

The usual battery has three or more cells made up of a plurality of positive and negative plates arranged alternately. Such a cell adapted to be fitted into a cell jar, not shown, is illustrated in Fig. 1, consists of positive and negative plates 5 having the usual terminal lugs 6 placed in contact and autogenously welded to bridge bars 7, bearing the usual terminal lugs 8 forming the electrical terminals for the cell. The particular plates shown are of the thin plate type, constructed in accordance with the process described and claimed in my application, filed February 21, 1921, Serial No. 446,768. The separators 10 placed between each of the plates and on the outside of each outer plate are preferably plain sheets of fibrous material.

I have secured excellent results in using separators both for the preliminary assembling and shipping, and in the battery when in use. By making these separators of plain paper of say one twenty-fifth of an inch in thickness, although the thickness of course is immaterial and may be selected for the particular requirements. Such paper is of such a size that it projects beyond the perimeter of the grids in all directions except at the terminal lugs. The method of placing these separators in position may be conveniently accomplished by simply inverting the plates and holding them in a rack or support such as indicated at 15 in Fig. 6, slipping the separators between the plates in the manner shown. When the unit is thus assembled, it may be temporarily held together by an elastic band such as indicated at 12 and a number of these elements placed in jars indicated at 20 Fig. 4, with their terminals temporarily connected with a conductor 18, the body of the plates being immersed in a suitable electrolyte 19 and thus given at the factory the forming and developing cycle.

The wet separators tending to swell at their edges close across the edges of the plates in all directions as shown at 10ª in Fig. 5, thus substantially enclosing the unit, and these fibre separators are saturated with the electrolyte whereby the whole forms a complete unit fully charged and ready for use.

Without disturbing its condition of readiness for use, they may be shipped to any desired distance point by enclosing them in a substantially liquid and air tight wrapper. I have demonstrated that a very effective and economical form of wrapper is a parchment or paper treated to be impervious to the liquid carried in the fibrous separators, as in a sponge. The completely charged element is placed upon such a paper indicated at 25. which may then be folded along the dotted lines 26 to surround the element. The ends are then closed tightly by cross folding the extending portion of the paper. The lower side of the element being substantially rectangular, the flap may be brought up as indicated at 28, Fig. 2. The upper side of the container is folded to conform to the edges of the bars 7 as indicated at 29, and the flap 30 brought down over one side, and the whole wrapper securely bound. I have shown cords designated 35, these cords preferably encircling the enclosed unit at two zones 35ª and 35ᵇ in one direction while the longitudinal cords 35ᶜ retain the flaps 30 and 28. This latter cord should not be drawn too tightly but just enough to hold the flaps in position in order not to unduly strain the wrapper at the tops of the terminal lugs. Another preferred method of securing the wrapper is by the use of an adhesive strip along the overlapping edges of the paper and holding the flaps 28 and 30.

In this condition, the cells may be shipped complete assembled and fully charged and at materially less rates than are required for a battery filled with electrolyte likely to escape, and requiring being maintained in upright position. The elements for a battery occupy much less space than a package or crate for a complete battery, thus effecting an economy over the cost to ship completed batteries, even where this is possible. Upon reaching their destination, such as a storage battery service station, any employee whether skilled or unskilled may unwrap the package by removing the wrapper 25, and then place the cells in the battery jars and connect the terminals in the usual manner to complete the battery.

Unless the cells have been in transit or storage unduly long, they will be fully charged and need no further attention. In case they are not fully charged, the discharge is comparatively slight as there has been no opportunity for the plates to be exposed to heat or oxidize or dry out materially. Thus the battery need only be charged for a few hours by the same process of treatment as is usual to recharge a battery in service when it becomes too weak to properly function. The difficulty of reforming charge and developing cycles is entirely unnecessary.

In case the battery plates are not of such a structure as will properly admit of using the same separators which were placed in the cell at the factory, other separators may be placed in the position shown in Fig. 7 at 40. These separators have ribs 41 and grooves 42 to permit the circulation of electrolyte as is necessary with some form of plates. Under such circumstances, the cell upon being received is unwrapped and the separators are simply removed and others placed in position by a method such as above mentioned in connection with Fig. 6. The cost of this operation as compared to previous methods of shipping even though the original separators are thrown away is exceedingly slight as both the cost of the separators and the labor of replacing them with the permanent grooved separators is a matter of very few cents for each battery.

The claims retained in this case are drawn to a method of making and shipping storage battery cells in accordance with my invention hereinbefore described. The claims to the product may be found in my copending application, Serial No. 686,760 filed January 17, 1924.

From the foregoing description, it will be seen that I have devised and put into use, what experience has demonstrated, is a very effective process of assembling and shipping storage battery elements, which may be later placed in the storage battery containers and made into a complete battery with great facility and economy. I have eliminated the difficulties of previous methods of shipping and assembling storage battery plates and elements and have particularly eliminated the difficulties incident to equipment and skill of labor required in assembling battery parts at service stations.

By the use of my invention, the battery elements each consist of a single cell, completely charged and by reason of the fibrous material which completely fills the space between the plates, the active portions of the plates are covered and the active material held in place the electrolyte is maintained in contact with all the surfaces of the plates the access of air thereto is prevented and the cell may be maintained in its original charged condition for several months. At the same time, these fibrous porous separators act as cushions and spacers safeguarding the breakage of the plates or any parts of the element in shipment. These separators may be left in place and the completed battery assembled, or they may be withdrawn and replaced with any other commercial separator without requiring any special skill or equipment whatever. The reforming charge and cycle is eliminated, it being only necessary in some instances to replenish the normal charge due to discharge occurring in any cell as a result of local action, and in many instances when the cells are put into use within a few days after they are originally shipped, no charging is required. In a word, I am enabled by this invention to provide a completely charged element without its usual container, ready to function normally and which may be shipped in that condition.

The wrapping device used for shipping is simply a protection and a further insurance against loss of this electrolyte which might occur particularly by evaporation.

In addition to the physical characteristics of my system above outlined, this is another features discovered only after considerable experiment in attempting to attain the results of this invention, for example; I find that for the system of treatment of the cell in the shipping thereof to be commercially practicable and successful, the specific gravity of the acid, that is the electrolyte must be higher than 1.200. Any lower specific gravity, I have found results in very rapid oxidization with destructive effect upon the active materials and the lead.

Having thus described my invention, what I claim is:—

1. A process of making and shipping storage battery cells consisting of assembling the plates with separators therebetween, and then charging the cells, said separators consisting of porous material saturated with electrolyte, wrapping the cells so formed in a pliable sheet impervious to electrolyte, whereby the cells may remain charged and in operative condition and may be freely handled and shipped.

2. A process of making, shipping and assembling storage battery elements into complete batteries at points distant from the place of manufacture, consisting of forming the plates, placing porous separators therebetween and in contact with the surfaces of the plates, forming and developing the elements to a fully charged condition, and then enclosing the elements with a temporary protective material adapted to prevent the loss of the electrolyte saturated in the separators during shipment.

3. A process of making, shipping and assembling storage battery elements into complete batteries at points distant from the place of manufacture, consisting of forming the plates, placing porous separators therebetween and in contact with the surfaces of the plates and protecting the edges thereof, forming and developing the elements to a fully charged condition, then completely enclosing the elements with a protective wrapper adapted to prevent the loss of the electrolyte saturated in the separators, the removal of the wrapper and assembling of the elements into the battery jars and completing of the multiple-cell battery after shipment of the elements.

4. A process of manufacture, shipment and assembling of storage battery cell elements consisting of forming the complete elements with porous separators between the plates, charging the same at the factory, and enclosing the plates by surrounding the entire element with a wrapper to prevent the loss of electrolyte held in saturation in the separators, shipping the elements to a distant point, the removal of the wrapper and separators, and substitution of permanent separators and the assembling of the same into batteries.

5. A process of manufacture, shipment and assembling of storage battery cell elements consisting of forming the complete elements with porous separators between the plates, charging the elements at the factory to condition the electrolyte to a specific gravity of at least 1.200, and then enclosing the cell by surrounding the entire element with a temporary wrapper to prevent the loss of electrolyte in the saturation of the separators, shipping the elements to a distant point, and assembling of the same into batteries.

6. The process of assembling and shipping storage battery elements consisting of assembling the plates of the elements with separators, saturated with electrolyte positioned therebetween, charging the elements and packing the elements when so charged with the saturated separators maintained in place, in an air-tight package, whereby the cells may remain charged and in operative condition during subsequent handling and shipping.

7. The process of assembling and shipping storage batteries, which comprises electrolytically forming the plates at the point of manufacture, placing separators saturated with electrolyte between and in contact with the surfaces of the plates and enclosing the elements with a temporary protective shipping cover adapted to prevent the loss of the electrolyte by evaporation and to prevent sulphation of the plates.

8. The process of making and shipping storage battery elements and assembling storage battery elements in complete batteries at points distant from the place of manufacture, consisting of forming the plates electrolytically, placing separators therebetween and in contact with the surfaces of the plates and protecting the edges thereof, completely enclosing the elements in an air-tight shipping package adapted to prevent the loss of electrolyte saturated in the separators, shipping such package, removing the wrapper and assembling the element into a battery jar and completing the charging of the battery after assembly of the element in the battery.

9. The process of assembling and shipping a storage battery element, consisting of assembling the plates of the element with separators, saturated with electrolyte, positioned therebetween, charging the elements with the separators maintained in place, packing the elements when so charged in an air-sealed package, and shipping the package whereby the cells may remain charged and in operative condition upon arrival of the place of destination.

10. The process of assembling and shipping storage batteries, which comprises electrolytically forming the plates at the point of manufacture, placing separators between and in contact with the surfaces of alternate, positive and negative plates and enclosing the assembled element with a temporary protective shipping cover adapted to prevent sulphation of the plates.

11. The process of making, shipping and subsequently assembling storage battery elements into complete batteries at points distant from the place of manufacture, consisting of forming the plates electrolytically, placing separators therebetween in contact with the surfaces of alternate, positive and negative plates, completely enclosing the assembled element in an air-tight shipping package, adapted to prevent the loss of electrolyte carried by the separators, shipping such package, removing the wrapper and assembling the elements into battery jars.

12. The process of manufacturing, shipping and assembling storage batteries, consisting of electrolytically forming the complete elements with separators between the plates during the forming period at the point of manufacture, enclosing the plates and separators in an air-tight package to maintain the electrolytically saturated condition of the separators and plates, shipping the elements from the point of manufacture when so packed, removing the covering of the elements at the point of destination and substituting other separators and assembling the elements with the substituted separators directly in the battery jars.

In testimony whereof, I hereunto affix my signature.

CLARENCE W. HAZELETT.